United States Patent [19]

Hammond et al.

[11] Patent Number: 5,550,173
[45] Date of Patent: Aug. 27, 1996

[54] POLYESTER COMPOSITION

[75] Inventors: Timothy Hammond, Stockton on Tees; Jasbinder S. Bal, Grindon, both of United Kingdom

[73] Assignee: Zeneca Limited, London, England

[21] Appl. No.: 432,116
[22] PCT Filed: Nov. 4, 1993
[86] PCT No.: PCT/GB93/02279
  § 371 Date: May 5, 1995
  § 102(e) Date: May 5, 1995
[87] PCT Pub. No.: WO94/11445
  PCT Pub. Date: May 26, 1994

[30] Foreign Application Priority Data

Nov. 6, 1992 [GB] United Kingdom ............... 9223350

[51] Int. Cl.⁶ ..................... C08L 67/00; C08G 63/91
[52] U.S. Cl. ................. 523/122; 523/124; 525/415; 435/135

[58] Field of Search ..................... 523/122, 124; 525/415; 435/135

[56] References Cited

U.S. PATENT DOCUMENTS 5,126,255  6/1992  Anderson et al. ............... 435/135

FOREIGN PATENT DOCUMENTS 443270   8/1991   European Pat. Off. .
450777  10/1991   European Pat. Off. .
921548   2/1992   WIPO .
924413   3/1992   WIPO .

*Primary Examiner*—Paul R. Michl
*Assistant Examiner*—LaVonda R. DeWitt
*Attorney, Agent, or Firm*—Cushman Darby & Cushman, LLP

[57] ABSTRACT

A polymer composition comprising at least one structural polymer and at least one oligomer of at least one polymer selected from the group; polyhydroxyalkanoates, polylactide, polycaprolactone and co-polymers thereof.

11 Claims, No Drawings

POLYESTER COMPOSITION

THIS INVENTION relates to a polymer composition and to oligomers useful as components thereof.

The addition of specific chemical plasticisers may be used to improve the flexibility, the impact strength and extensions to break of polymer mouldings. The free volume theory has been developed to describe the mechanism of polymer plasticisation (Kirk-Othmer Encyclopedia of Chemical Technology, 3rd Ed. Vol 18, pages 111–185). The addition of an effective plasticising agent leads to an increase in free volume and increased mobility Of the polymer chains. The glass transition temperature represents the change in the amorphous phase from an inelastic glassy material to a more mobile rubbery material. On entering the rubbery phase, this transition is marked by larger increases in the specific volume of the polymer per unit rise in temperature.

Effective plasticisers commonly lower the glass transition temperature of a polymer formulation. A routine measurement for plasticiser effectiveness is the amount by which the glass transition temperature has been depressed from that of the pure polymer for a given incorporation level of the plasticiser.

The typical plasticiser is not a biodegradable material which represents a drawback for plasticisers of biodegradable polymers.

It has now been found that oligomers of very low molecular weight of certain polymers can provide similar benefits when added to a polymer composition.

Thus, according to the present invention there is provided a polymer composition comprising at least one biodegradable microbiologically produced structural polymer (PHA) and at least one oligomer selected from the group: hydroxyalkanoate, lactide, caprolactone and co-oligomers thereof.

The oligomer may be derived from the same polymer as the structural polymer or from a different polymer.

By "structural" is meant shapeable into articles having significant mechanical properties. Such a structural polymer has a weight average molecular weight (Mw) of at least 50000; commonly it is at least 200000 and up to 2.0 million, for example 1.5 million.

In one form of the composition the oligomer has a glass transition temperature (Tg) less by 10° C., especially by 50° to 150° C., than that of the structural polymer. Typically it has Mw of 2000 or less, for example in the range 200 to 1200, but high enough to ensure substantial non-volatility in the structural polymer during melt processing. Thus it should be essentially non-distillable, except possibly under high vacuum. Typically the oligomer is liquid or waxy solid. The oligomer is generally a blend of different short chains, i.e. monomers, dimers, trimers etc. The oligomers may be linear or branched and could contain one or more different monomer units. Therefore, although the Mw may be given as an average, it will in fact be a range of different molecular weights corresponding to the composition of the oligomer. The mutual proportions of the structural polymer and the oligomer are non-statistical, that means they are different from those occurring in structural polymer as prepared. Preferably the content of oligomer in the polymer composition is sufficient to plasticise the PHA, that is, to decrease its Tg by 2° to 50° C., especially 5° to 30° C.

In another form of the composition the oligomer may be used as a filler. Such oligomer has a Tg within 10° C. of that of the PHA. Typically it has a Mw in the range 2000 to 25000, especially 4000 to 20000. Such a composition has a Tg substantially equal to that of the structural polymer alone, and therefore should contain added plasticiser (for example as above) if a lower Tg is required. Whether or not a lower Tg is required, this form of the composition is advantageous for making polymer articles which are required to be more rapidly biodegradable than the structural polymer alone, because the oligomer degrades faster than the usual filler materials and opens the structure to provide a larger surface area for enzymatic degradation of the structural polymer to occur.

Typically the content of oligomer is in the range 1 to 40 phr (where "phr" denotes per hundred parts by weight of structural polymer), preferably 1 to 20 phr.

The invention is applicable to polymers capable of crystallisation.

The PHA is especially capable of a relatively high level of crystallinity, for example over 30%, especially 50–90%, in the absence of plasticiser. Suitably it is or includes at least one polyester having units of formula I:

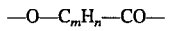

$$-\text{O}-\text{C}_m\text{H}_n-\text{CO}- \qquad \text{I}$$

where m is in the range 1–13 and n is 2m or (if m is at least 2) 2m–2. Typically $C_mH_n$ contains 2–5 carbon atoms in the polymer chain and the remainder (if any) in a side chain in very suitable polyesters m is 3 or 4, n is 2m and especially there are units with m=3 and m=4 copolymerised together and with respectively a $C_1$ and $C_2$ side chain on the carbon next to oxygen in the chain. Particular polyesters contain a preponderance of m=3 units, especially with at least 70 mol % of such units, the balance being units in which m=4. The Mw of the PHA is especially over 200000.

The PHA may be a blend of two or more differing in the value of m. A particular example contains (a) PHA consisting essentially of Formula I units in which 0–5 mol % of units have m=4, the rest m=3; and (b) PHA consisting essentially of Formula I units in which 5–30 mol % of units have m=4, the rest m=3.

In each such PHA there are side chains as above mentioned.

The proportions of the polyesters in such a blend are preferably such as to give an average m=4 content in the range 4–18 mol %.

In the PHA having units with m=3 and/or m=4 there may be very small, typically fractional, percentages of units having higher values of m. PHA consisting essentially of m=3 units is poly-3-(R)-hydroxybutyrate (PHB), and PHA consisting of m=3 and 4 units is polyhydroxybutyrate-co-valerate (PHBV).

The PHA can be a product of fermentation especially of a microbiological process in which a microorganism lays down PHA during normal growth or is caused to do so by cultivation in starvation of one or more nutrients necessary for cell multiplication. The microorganism may be wild or mutated or may have the necessary genetic material introduced into it. Alternatively the necessary genetic material may be harboured by an eukariote, to effect the microbiological process.

Examples of suitable microbiological processes are the following: for Formula I material with m=3 or m=partly 3, partly 4:

EP-A-69497 (*Alcaligenes eutrophus*) for Formula I material with m=3:

U.S. Pat. No. 4,101,533 (*A.eutrophus* H-16) EP-A-144017 (*A. latus*);

for Formula I material with m=7–13: EP-A-0392687 (various *Pseudomonas* sp.).

In such processes the polymer can be extracted from the fermentation product cells by means of an organic solvent, or the cellular protein material may be decomposed using an aqueous route leaving microscopic particles of polymer. For specialised end uses the cellular protein may be partly or wholly allowed to remain with the polymer, but preferably subjected to cell breakage. A useful process for extraction is given in EP-0 145 233.

The repeat units of the oligomer, if a hydroxyalkanoate, can be the same as or different from those of the structural polymer.

As a result of its relatively low molecular weight the end groups of the oligomer are capable of affecting its properties significantly. It appears especially for the composition using oligomer of Mw under 2000 that a useful plasticiser for structural PHA has carboxyalkyl and hydroxy end groups: such alkyl groups preferably have fewer than 12 carbon atoms. Instead of the hydroxy end group, an alkenyl or acyloxy end group may be present, and the preferred carbon numbers of the acyloxy end group are the same as for the alkyl end group. Combinations of hydroxy or acyloxy or alkenyl at one end and carboxy or acyloxy at the other end, or a macrocyclic ester, can be used. Mixtures of such oligomers can be used.

The oligomer is preferably selected from the group: polyhydroxybutyrate (PHB), co-oligomers thereof with hydroxyvalerate (PHBV) and oligocaprolactone.

The oligomer may be synthetic or a fermentation product. It may be isotactic, syndiotactic or atactic, preferably it is isotactic or syndiotactic. Conveniently the oligomer is a fermentation product or a depolymerised fermentation product. The fermentation conditions are in general the same as for the corresponding structural polymer.

The oligomer may be from a different polymer to the structural polymer, for example, oligomers of polycaprolactone with structural PHBV. Alternately the structural polymer and the oligomer may be the same polymer, for example, PHBV oligomers with PHBV structural polymer.

The invention provides also methods of making the composition by mixing its components together. For assured intimate mixing the components may be all dissolved. More conveniently in industrial operations they may be mixed in the melt or under shear, for example by passage through an extruder. The components need not have been isolated in the pure state: thus the polymer may be introduced as the wet slurry or organic solution obtained from microorganism cells, before stages of solvent removal. In this way the formation of the composition is integrated backwards into the structural polymer production process.

The composition may contain any of the usual polymer processing additives, for example particulate fillers, reinforcing fibres, pigments, nucleating agents and plasticisers other than those defined herein.

The invention in a further aspect provides such oligohydroxyalkanoates (OHA) per se having a molecular weight Mw in the range 4000 to 25000 especially a Tg in the range −50° C. to −150° C. Such oligomers are useful in many ways. For example they can be used as biodegradable solvents or as plasticisers or promoters of biodegradation or biodegradation for other polymers for example synthetic polyesters whether biodegradable or not. Examples of such synthetic polyesters are PHBV, polylactic acid and polycaprolactone.

Further, the invention provides processes of making the oligomers. These processes include:

(a) regular organic synthesis, for example by ring-opening a lactone;

(b) extracting from as made PHA its content of low molecular weight material;

(c) extracting from thermally degraded PHA, for example from processed PHA, for example articles made by melt processing or semi-processed products such as moulding feed granules, its content of low molecular weight material;

(d) depolymerising PHA, possibly after part-degradation by other means.

Process (d) could be carried out biologically but this is not easy to control. More conveniently it is carried out by chemical lysis, that is, pyrolysis, hydrolysis, alcoholysis (including phenolysis) or acylysis or a combination of two or more of these. Thus for example PHA can be pyrolysed or reacted with water to give OHA having carboxy and respectively alkenyl or hydroxy end groups or a macrocyciic ester; or with at least one alcohol (preferably $C_1$–$C_5$, conveniently monohydric but possibly di, tri or tetrahydric) to give OHA having hydroxy and carboxylic ester end groups. In another example PHA can be reacted with at least one carboxylic acid to give OHA having acyloxy and carboxy end groups. The OHA produced by such alcoholysis or acylysis can be esterified by respectively at least one carboxylic acid or alcohol. If desired, such an esterified OHA may be made by simultaneous alcoholysis and acylysis by reaction with alcohol and carboxylic acid in the same reaction mixture and/or with an ester (possibly oligomeric) of alcohol and carboxylic acid. Any of these reactions (other than with water itself) can involve water as part-reactant of (with ester reactant) catalyst. They are preferably carried out in presence of a catalyst, which could be an alkaline material such as a tertiary amine or a hydroxide of an alkali metal or a quaternary ammonium, but is preferably a strong acid, to give the required OHA direct, rather than one with salt end groups requiring acidification and separation. Suitable acids are sulphuric, sulphonics and acid-form cation exchange resins.

In such lysis of PHA the starting PHA is suitably in finely divided form (by grinding or as-derived from microorganism cells) and is suspended in the lysis reactant. It is believed that lysis involves scission of the starting polymer chain into fragments that are relatively large (for example large enough to be insoluble in 90:10 methanol:water) and further scission of such fragments, but also involves cutting short pieces from insoluble polymer. When lysis is by alcohol or alcohol:water, a soluble product is separated and worked up to provide OHA to be used as a plasticiser. Lysis is preferably stopped while some solid material is still present, to ensure that the soluble OHA does not suffer too much lysis, giving oligomers of too low molecular weight to be useful in the composition. The insoluble fraction may be recovered and subjected to further lysis alone or with further starting PHA. Alternatively it may be separated and used for example in compositions in which low molecular weight PHA is required but plasticisation is not needed or is provided by other means.

In alternative depolymerisation methods the starting PHA can be in the form of a solution, in for example a halogenated hydrocarbon such as may be used for extracting it from microorganism cells or from blends with other polymers or from scrap or used articles. The solvent can be removed before, during or after the lysis reaction.

In addition to the above, polyfunctional oligomers can be made. This involves the preparation of oligomers by the aforesaid methods in the presence of a polyfunctional alcohol, or followed by reaction with a polyfunctional alcohol such as glycerol or pentaerythritol. The resulting reaction may be catalysed by polycondensation catalysts known in the art, such as dibutyl tin laurates.

The invention provides processes of shaping the polymer composition and the resulting shaped articles. The polymer composition can be used in any of the usual methods for forming articles such as injection moulding, compression moulding, extrusion of fibre or films, extrusion of profile, gas-current spinning, tack spinning, coating melt onto substrate, coating latex onto substrate, shaping solution in volatile solvent.

Examples of shaped articles made by such methods include films, especially for packaging, coated products (such as paper, paperboard, non-woven fabrics), fibres, non-woven fabrics, extruded nets, personal hygiene products, bottles and drinking vessels, agricultural and horticultural films and vessels, slow-release devices, incontinence devices and wound care products, ostomy bags. Alternatively, the polymer composition with suitable additives can be used as an adhesive.

In particular these include sustained release systems for drugs and agrochemicats. The invention makes it convenient to design for a range of release rates by suitably mixing PHAs and OHAs. Alternately the polymer composition can be used with suitable additives as an adhesive.

The following examples are illustrative of the present invention and do not limit the scope of the invention.

EXAMPLE 1

Preparation of OHA: Suspension Process 100 cm³ of 1 mol l⁻¹ sulphuric acid in deionised water was added to 100 cm³ of methanol and the resulting solution was slurried with 100 g of a microbiologically produce 3-hydroxybutyrate-3-hydroxy-valerate copolymer containing 10 mol % hydroxyvalerate units and having $M_w$=450000. The slurry was refluxed for 50 h, to effect a methanolysis reaction with reduction in molecular weight. The product was (A) an insoluble powder of $M_w$=5640 (estimate by Gel permeation chromatography; and (B) an alcohol soluble material which remained dissolved in the supernatant liquid. The liquid fraction was neutralised by addition of 5 mole l⁻¹ sodium hydroxide solution and extracted three times, each into 350 ml of chloroform.

The extract was fed to a rotary evaporator. The resulting oil examined by ¹H NMR was mainly a mixture of OHAs of structure:

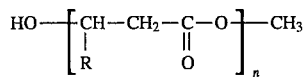

where
R=—CH₃ or —CH₂—CH₃; and
n is between 2 and 4 on average.
A small amount of material had

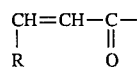

end groups.

EXAMPLE 2

Preparation of Composition

OHAs A and B prepared in Example 1 were added at 20 phr to samples of high molecular weight 10% hydroxyvalerate/hydroxybutyrate copolymer used as starting material in Example 1. The mixtures were each dissolved in chloroform and cast as a film in an aluminium tray. The film was vacuum dried at 60° C. for 40 min. A control sample was also prepared with no additives.

Differential Scanning Calorimetry (DSC) was used to measure the glass transition temperature Tg of the polymer formulations. A Perkin-Elmer DSC-7 was used under programmed heating control. A 10 mg sample was mounted in a DSC pan and melted by heating from 20° to 200° C. at 20° C. min⁻¹.

The molten material was held at 200° C. for 2 minutes and then very rapidly quenched by cooling to −100° C. at −100° C. min⁻¹. The sample was then slowly reheated from −100° C. to +50° C. at 20° C. min⁻¹. The glass transition temperature was determined as the point of inflexion in the heating trace.

Table 1 summarises the results.

TABLE 1

| Additive | Tg °C. |
|---|---|
| None | −2.86 |
| A | −2.33 |
| B | −20.28 |
| (B Alone | −78.14) |

For all three compositions a single Tg was observed. The Tg of the composition containing A indicates that the components were compatible but that plasticisation had not occurred.

The Tg of the composition containing B was significantly below that of the control and indicates a compatible plasticised system.

Comparison with Calculated Tg

The Fox equation (*Bull. Am. Phys. Soc.* 123, 2, 1956) predicts Tg for a composition compatible in the amorphous and melt phases.

$$\frac{1}{T_g \text{ (formulation)}} = \frac{W \text{ (polymer)}}{T_g \text{ (polymer)}} + \frac{W \text{ (additive)}}{T_g \text{ (additive)}}$$

where W is the weight fraction of the respective components and the temperatures are in K. Inserting $T_g$ −78.14° C. for B and −2.87 for copolymer, for a 20 phr B addition, a $T_g$ of −19.2° C. is predicted. This compares very favorably with the observed −20.28° C.

EXAMPLE 3

Preparation of OHA (Solution process)

(a) Low Molecular weight water soluble oligomers

PHB-homopolymer (50 g, 0.58 mol) was dissolved in 500 ml 1,2 -dichioroethane by heating under reflux for 1 hour. Then a solution of sulphuric acid (98% w/w, 10 ml) in methanol (200 ml) was added. The mixture was heated under reflux and sampled after 10, 20 and 30 hours. Each sample was worked up by cooling, stirring with half-saturated brine and separating an aqueous layer; the aqueous layer was extracted 3 times with chloroform; the extracts were washed with brine, then with sodium bicarbonate solution, then again with brine; then dried over magnesium sulphate and concentrated in a rotary evaporator. The resulting oils were examined by DSC. Sample preparation was as described in Example 2. The samples were rapidly cooled to −140° C. at a rate of −100° C. min⁻¹. The sample was then slowly heated from −140° C. to 50° C. at 20° C. min⁻¹. Resulting Tgs are shown in Table 2.

TABLE 2

| Reaction time h | Tg °C. | T cryst °C. | T fus °C. | ΔH cryst Jg$^{-1}$ | ΔH fus Jg$^{-1}$ |
|---|---|---|---|---|---|
| 10 | −95 | −69 | −17 | −3 | 50.6 |
| 20 | −100 | −69 | −26 | −36 | 47.7 |
| 30 | −98 | −64 | −18.6 | −13.7 | 34.4 |

Notes:
$T_{cryst}$ is the crystallisation peak temperature at which the sample was observed to crystallise in the cooling phase of DSC;
$T_{fus}$ is the temperature at which the sample was observed to liquefy in the heating phase of DSC;
$\Delta H_{cryst}$ is the heat evolution on crystallisation;
$\Delta H_{fus}$ is the heat intake on liquefaction.

(b) Higher molecular weight organically soluble oligomers obtained by slight modification to the above process.

After the reflux stage, samples were removed at intervals of 2, 3, 4, 6 and 10 hours. Each sample was then worked by washing with half saturated brine and the organic layer separated. The organic phase was then neutralised using dilute ammonium hydroxide. The organic phase was separated and then dried over magnesium sulphate, filtered and evaporated to constant volume in a rotary evaporator. The resulting viscous liquids or waxes were examined by DSC. Their Tg values are set out in Table 3.

TABLE 3

| Degradation time/ (hours) | Tg | physical appearance |
|---|---|---|
| 2 | −83.6 | wax |
| 3 | −86.2 | wax |
| 4 | −88.4 | oily wax |
| 6 | −91.5 | liquid |
| 10 | −97.2 | mobile liquid |

Both the changes in physical appearance and the reduction in Tg suggest a reduction in molecular weight with degradation.

EXAMPLE 4

Generation of oligomers by thermal scission.

A 2 g sample of a PHBV copolymer containing 10% HV units ($M_w$ 477,000) was placed within a tube furnace operating at a temperature of 400° C. A nitrogen supply operating at 5 liters per hour was used to sweep the degradation products into a trap cooled by liquid nitrogen.

The resulting liquid product was collected and examined by DSC and was shown to have a Tg of −86° C., which was very similar to that observed for the oligomeric products seen in Examples 1 and 3.

EXAMPLE 5

Mechanical properties of oligomer plasticised films.

An organic soluble fraction was taken after 3 hours reflux and worked up by the method detailed in Example 3(b). This was added at a 20 phr level to a 10% w/w solution of a PHBV ($M_w$=680,000) copolymer containing 7% HV units in chloroform.

The resulting blend was cast into covered 15×15 cm film casting trays and the solvent allowed to slowly evaporate. Film thicknesses in the range 0.19 to 0.22 mm were produced. The films were allowed to dry over 4 days and then oven annealed at 60° C. for 15 hours to ensure full crystallisation and to ensure complete solvent removal.

Test pieces were cut from the resulting films (20 mm gauge length "dog-bone"). These were tested on an Instron 4501 instrument operating in Tensile mode. Five replicates were taken for each sample. An extension rate of 10 mm min$^{-1}$ was used. The mechanical test results are presented in Table 4.

TABLE 4

| Mechanical Property | No additives | 20 phr oligomer |
|---|---|---|
| Stress at maximum load (MPa) | 28.2 | 23.2 |
| Youngs Modulus (GPa) | 1302 | 1074 |
| Elongation at break (%) | 15.1 | 27.2 |
| Energy to break (J) | 0.052 | 0.099 |

Conclusion

The formulation with 20 phr oligomers added gave a lower result for Young's Modulus than the formulation without the additive and a higher elongation and energy to break than the formulation without the additive. These parameters, particularly elongation and energy to break, indicate that the film of the formulation containing oligomer was considerably more flexible than the corresponding film without oligomer even after a 15 hour annealing treatment at 60° C.

EXAMPLE 6

PHBV with caprolactone oligomers.

The following proportions of oligocaprolactone (OCL) were blended into poly(hydroxybutyrate-co-hydroxyvalerate) containing 7% hydroxyvalerate ($M_w$=approx 500,000). A boron nitride nucleant was also added.

TABLE 5

| OCL Grade | Mol Weight (*) | Blend Components (w/w) | | |
|---|---|---|---|---|
| | | PHBV | OCL | BN |
| Tone$^+$ 301 | 300 | 80 | 20 | 1 |
| branched | | 65 | 35 | 1 |
| Tone 200 | 530 | 80 | 20 | 1 |
| Linear | | 65 | 35 | 1 |

*Manufacturers data
$^+$Tone is a trademark of Union Carbide.

The formulations were melt processed and subjected to mechanical tests as outlined below.
Melt Processing The polymeric components were powder blended and melt processed in a Betol single screw extruder. For blends of HB homopolymer with HB/HV copolymers (Examples 1 and 2) the barrel zone temperatures were set at 130°, 140° and 150° C. respectively. The materials were extruded through a 5 mm diameter circular die and granulated to polymer chip. The chips were injection moulded into tensile or impact test bars. The tensile bars were of gauge length 40 mm with typical cross-sectional areas of 2.4×5.3 min. The impact bar dimensions were 4.45×13.0×118 mm.
Mechanical Tests Tensile testing was on an Instron 1122 fitted with a Nene data analysis programme. A cross-head speed of 10 mm min$^{-1}$ was used. Izod impact strength was determined using a Zwick pendulum apparatus. The impact bars were notched as indicated in the tables.

The physical properties observed for these blends are summarised in Table 6. The incorporation of OCL leads to a reduction in stiffness, general increase in elongation to break and a dramatic improvement in Izod impact strength.

TABLE 6

PHBV blends with OCL. Physical property data and tensile tests 1 month post moulding

| OCL Grade | OCL:PHBV | I | II | III |
|---|---|---|---|---|
| Tone 301 | 20:80 | 0.482 | 19.33 | 120.25 |
|  | 35:65 | 0.386 | 9.401 | 304.25 |
| Tone 200 | 20:80 | 0.338 | 30.93 | 207.75 |
|  | 35:65 | 0.238 | 57.93 | 320.25 |
| None | 0:100 | 1.019 | 15.25 | 93.25 |

Key
I Young's Modulus/GPa
II Elongation at break/%
III 1 mm notched IZOD impact strength/Jm$^{-1}$

EXAMPLE 8

Table 7 summarises formulation data for blends of poly-(hydroxybutyrate-co-valerate) (sample preparation and experimental details are as for Example 6) with oligocaprolactone and the results of tensile tests carried out on the formulations. The blends give improved elongations to break and impact strengths compared with the control which is plasticised with Estaflex* (*Trade mark).

EXAMPLE 9

Two of the formulations outlined in Example 8 were converted into injection-blow moulded bottles. The bottles were stored at 28° C. for 4 weeks and then filled to capacity with 300 ml water. The bottle drop impact performance was assessed by the following method. The bottles were filled with water and left for 24 hours in a constant temperature (28° C.) and humidity room. A minimum of 10 bottles were dropped vertically onto a metal surface angled 5 degrees up from the horizontal. The bottles were drop tested in the constant temperature/humidity room under the same conditions. The results of impact tests are given in Table 8. The formulations contained Estaflex and boron nitride as given in Example 8.

TABLE 7

Physical Properties of OCL Blends with an 8%/HV Content poly(hydroxyburyate-co-hydroxyvalerate)

| | | Formulation Compounds w/w | | | | Tensile Tests | | | | |
|---|---|---|---|---|---|---|---|---|---|---|
| OCL Grade | Mol Weight+ | PHBV | OCL | Estaflex ATC | BN | 1 | 2 | 3 | 4 | 5 |
| None | n.a. | 100 | 0 | 10 | 1 | 24.9 | 0.571 | 18.56 | 59.3 | 936 |
| CAPA* 316 | 1000 branched | 100 | 10 | 10 | 1 | 20.8 | 0.395 | 27.95 | 63.0 | >1000 |
| CAPA 240 | 4000 linear | 100 | 10 | 10 | 1 | 21.9 | 0.473 | 20.47 | 51.4 | 942 |
| Tone 200 | 530 | 100 | 10 | 10 | 1 | 19.9 | 0.376 | 22.56 | 62.3 | >1000 |

*CAPA is a trademark of Solvay Interox.
+Manufacturers data
1 = Stress at maximum load Mpa
2 = Young's Modulus/GPa
3 = Elongation at break/%
4 = 0.25 mm notched Izod impact strength/Jm$^{-1}$
5 = Unnotched Izod impact strength Jm$^{-1}$

TABLE 8

| OCL Grade | Mol Weight | Ratio w/w PHBV | Ratio w/w OCL | Drop Height /cm | % surviving drop |
|---|---|---|---|---|---|
| None | n.a. | 100 | 0 | 122 | 78% |
| Capa 316 | 1000 | 100 | 10 | 182 | 100 |
| Tone 200 | 530 | 100 | 10 | 182 | 90 |

It can be seen that a dramatic improvement in impact properties is observed with the additives containing the OCL. Only 78% of the bottles survived a drop from 122 cm for the control sample. The blends containing OCL survived greater drop heights with 90–100% of the bottles surviving a drop from 182 cm.

We claim:

1. A polymer composition comprising at least one biodegradable microbiologically produced polyhydroxyalkanoate (PHA) having a of molecular weight Mw of at least 50000, having repeating units of formula I:

$$—O—C_mH_n—CO— \qquad I$$

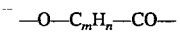

where m is 3 in all said units or m is 3 in some of said units and m is 4 in the remainder of said units; and n is 2m and at least one oligomer selected from the group consisting of hydroxyalkanoate, lactide, caprolactone and co-oligomers thereof.

2. A polymer composition according to claim 1 in which the oligomer has an average molecular weight of 2000 or less.

3. A polymer composition according to claim 2 in which the content of the oligomer is in the range 1 to 40 parts by weight per hundred parts of PHA and the PHA is plasticised thereby to the extent of a decrease of 5° to 30° C. in its glass transition temperature Tg.

4. A polymer composition according to claim 1 in which the oligomer has an average molecular weight in the range 4000 to 20000 and has a glass transition temperature Tg within 10° C. of the Tg of the PHA.

5. A polymer composition according to claim 1 in which the oligomer is an oligohydroxyalkanoate derived from a microbiologically produced PHA.

6. A polymer composition according to claim 1 in which the oligomer has repeating units of formula I:

$$-O-C_mH_n-CO- \quad \text{I}$$

where m is 3 in all said units or m is 3 in some of said units and m is 4 in the remainder of said units; and n is 2m.

7. A polymer composition according to claim 6 in which m is 3 in at least 70 mol % of the repeating units of said oligomer.

8. A process of making a composition according to claim 1 which comprises mixing the PHA and the oligomer in the dissolved or molten state.

9. A method of making shaped articles characterised by using a polymer composition according to claim 1.

10. An oligohydroxyalkanoate having an average molecular weight Mw in the range 4000 to 25000, which is the product of de-polymerising a microbiologically produced PHA having units of formula I:

$$-O-C_mH_n-CO- \quad \text{I}$$

in which m is 3 in all said units or m is 3 in some of said units and 4 in the remainder of said units, and n is 2m, said PHA being crystallisable to the extent of over 30% and having carboxyalkyl and hydroxy end groups.

11. A polymer composition according to claim 1 in which m is 3 in at least 70 mol % of the repeating units of said PHA.

* * * * *